US00RE36231E

United States Patent [19]

Rondeau

[11] E Patent Number: Re. 36,231

[45] Reissued Date of Patent: Jun. 22, 1999

[54] FIBEROPTIC CONNECTOR ASSEMBLY AND METHOD AND DEVICE FOR THE MANUFACTURE THEREOF

[75] Inventor: Michel Y. Rondeau, San Jose, Calif.

[73] Assignee: Fibotech, Inc., San Jose, Calif.

[21] Appl. No.: 08/333,258

[22] Filed: Dec. 12, 1994

Related U.S. Patent Documents

Reissue of:

[64] Patent No.: 5,305,406
Issued: Apr. 19, 1994
Appl. No.: 07/589,868
Filed: Sep. 27, 1990

[63] Continuation-in-part of application No. 07/429,445, Oct. 31, 1989, abandoned.

[51] Int. Cl.[6] ..... G02B 6/36

[52] U.S. Cl. ..... 385/81; 385/53; 385/92

[58] Field of Search ..... 385/53, 55, 56, 385/68, 81, 82, 92

[56] References Cited

U.S. PATENT DOCUMENTS

| | | | |
|---|---|---|---|
| 4,023,886 | 5/1977 | Nakayama et al. | 385/80 |
| 4,076,379 | 2/1978 | Chouinard | 385/73 |
| 4,116,655 | 9/1978 | Lewis | 65/401 |
| 4,127,319 | 11/1978 | Forney, Jr. et al. | 385/81 |
| 4,140,366 | 2/1979 | Makuch et al. | 385/58 |
| 4,140,367 | 2/1979 | Makuch et al. | 385/59 |
| 4,162,119 | 7/1979 | Goodman | 385/60 |
| 4,173,389 | 11/1979 | Curtis | 385/92 |
| 4,178,068 | 12/1979 | Hoover | 385/78 |
| 4,193,665 | 3/1980 | Arnold | 385/72 |
| 4,205,897 | 6/1980 | Stankos | 385/60 |
| 4,208,093 | 6/1980 | Borsuk | 385/85 |
| 4,218,113 | 8/1980 | Uberbacher | 385/72 |
| 4,260,382 | 4/1981 | Thomson | 433/126 |
| 4,300,815 | 11/1981 | Malsot et al. | 385/81 |
| 4,310,218 | 1/1982 | Karol | 385/60 |
| 4,370,022 | 1/1983 | Johnson | 385/64 |
| 4,470,660 | 9/1984 | Hillegonds et al. | 385/58 |
| 4,678,264 | 7/1987 | Bowen et al. | 385/89 |
| 4,687,292 | 8/1987 | Krausse | 385/68 |
| 4,693,550 | 9/1987 | Brown et al. | 385/81 |
| 4,740,047 | 4/1988 | Abe et al. | 385/84 |
| 4,750,803 | 6/1988 | Schmidt | 385/72 |
| 4,752,111 | 6/1988 | Fisher | 385/55 |
| 4,767,181 | 8/1988 | McEowen | 385/78 |
| 4,785,139 | 11/1988 | Lynch et al. | 174/705 |
| 4,787,706 | 11/1988 | Cannon, Jr. et al. | 385/59 |
| 4,869,571 | 9/1989 | Hübner et al. | 385/77 |
| 4,946,236 | 8/1990 | Dautartas et al. | 385/17 |
| 4,968,109 | 11/1990 | Tanaka | 385/76 |
| 4,979,793 | 12/1990 | Bowen et al. | 385/140 |
| 5,042,900 | 8/1991 | Parker | 385/76 |
| 5,113,464 | 5/1992 | Wall | 385/81 |
| 5,140,662 | 8/1982 | Kumar | 385/87 |
| 5,216,735 | 6/1993 | Rondeau | 385/78 |
| 5,275,596 | 1/1994 | Long et al. | 606/28 |
| 5,276,752 | 1/1994 | Gugelmeyer et al. | 385/69 |
| 5,282,258 | 1/1994 | Hoshino | 385/70 |
| 5,305,406 | 4/1994 | Rondeau | 385/81 |

FOREIGN PATENT DOCUMENTS

| | | |
|---|---|---|
| 0-014-610 | 8/1980 | European Pat. Off. . |
| 3308-679-A1 | 9/1984 | Germany . |
| 53-6047 | 1/1978 | Japan . |
| 57-34514 | 2/1982 | Japan . |
| 63-250614 | 10/1988 | Japan . |

*Primary Examiner*—John D. Lee
*Attorney, Agent, or Firm*—Conley, Rose & Tayon, P.C.

[57] ABSTRACT

A fiberoptic connector assembly which includes an optical fiber that is engaged within a fiberoptic connector. The fiberoptic connector includes a metal core having a malleable external tip. The tip is deformed by physical contact during the manufacturing process, whereby the optical fiber is held within the fiberoptic connector by mechanical frictional engagement with the deformed portion of the tip. The manufacturing device includes a holder for holding the fiberoptic connector with the optical fiber disposed therewithin. A mechanical spring-loaded punch is utilized to make physical contact with the malleable tip of the fiberoptic connector to deform the tip upon physical contact with the punch. Also disclosed is the method that is utilized for manufacturing the fiberoptic connector assembly.

32 Claims, 3 Drawing Sheets

FIBEROPTIC CONNECTOR ASSEMBLY AND METHOD AND DEVICE FOR THE MANUFACTURE THEREOF

Matter enclosed in heavy brackets [ ] appears in the original patent but forms no part of this reissue specification; matter printed in italics indicates the additions made by reissue.

This Application is a continuation-in-part of our earlier filed U.S. application Ser. No. 07/429,445, filed Oct. 31, 1989, now abandoned.

BACKGROUND OF THE INVENTION

1. Field of the Invention

The present invention relates generally to fiberoptic connectors and to devices for joining connectors to the ends of optical fibers, and more particularly to a fiberoptic connector assembly and to a device which swages the metallic core of a fiberoptic connector around an optical fiber to join the connector and optical fiber together.

2. Brief Description of the Prior Art

A fiberoptic connector assembly includes a fiberoptic connector that is engaged to the end of an optical fiber. In the prior art, the engagement is generally achieved through the utilization of an adhesive, such as epoxy, to hold the optical fiber within the optical fiber bore of the fiberoptic connector. A disadvantage of such prior art connection methods is that the engagement process is time consuming while waiting for the epoxy to harden and the optical fiber can be non-centrally disposed within the optical fiber bore. Following the curing of the epoxy adhesive, the rearward end of such prior art assemblies may be crimped, such that a portion of the fiberoptic connector is mechanically engaged to a rearwardly projecting portion of the optical fiber.

SUMMARY OF THE INVENTION

It is an object of the present invention to provide a fiberoptic connector assembly device that joins a connector and optical fiber together without the use of liquid adhesives such as epoxy.

It is another object of the present invention to provide a fiberoptic connector assembly device that joins a connector to an optical fiber quickly and inexpensively.

It is a further object of the present invention to provide a fiberoptic connector assembly device that uniformly swages the metal core of a connector around an optical fiber to join the connector and optical fiber together.

It is yet another object of the present invention to provide a fiberoptic connector assembly, including a fiberoptic connector having an optical fiber engaged therewithin, wherein the optical fiber is frictionally engaged within the fiber bore of the fiberoptic connector.

It is yet a further object of the present invention to provide a method for the manufacturing of a fiberoptic connector assembly that may be accomplished in a relatively short time period.

The fiberoptic connector assembly of the present invention includes a fiberoptic connector having an optical fiber disposed therewithin. The fiberoptic connector includes a mechanically deformable portion disposed proximate the tip of the fiberoptic connector. The deformable portion is swaged by a suitable tool to mechanically deform the deformable portion such that the optical fiber is frictionally engaged within the fiberoptic connector.

The method for manufacturing the fiberoptic connector assembly includes the steps of inserting the optical fiber into a fiberoptic connector having a mechanically deformable portion and then deforming said mechanically deformable portion to functionally engage the optical fiber within the fiber bore of the fiberoptic connector. In a preferred embodiment, the deformable portion is radially symmetrically deformed, such that the optical fiber is centrally disposed within the bore of the s fiberoptic connector.

The fiberoptic connector assembly device includes a frame with a connector holder for the releaseable engagement of a fiberoptic connector having an optical fiber disposed therewithin. A spring loaded punch is slidably engaged upon two rails in alignment with the tip of the fiberoptic connector. A bore, having a cone shaped opening, is formed in the nose of the punch to impact and shape the metal core of the connector. Upon activating the punch, the tip of the metal core of the connector is uniformly deformed around the optical fiber residing within the bore of the connector, such that the optical fiber is frictionally engaged and centrally disposed within the tip of the connector.

It is an advantage of the present invention that it provides a fiberoptic connector assembly device that joins a connector and optical fiber together without the use of liquid adhesives such as epoxy.

It is another advantage of the present invention that it provides a fiberoptic connector assembly device that joins a connector to an optical fiber quickly and inexpensively.

It is a further advantage of the present invention that it provides a fiberoptic connector assembly device that uniformly swages the metal core of a connector around an optical fiber to join the connector and optical fiber together.

It is yet another advantage of the present invention that it provides a fiberoptic connector assembly, including a fiberoptic connector having an optical fiber engaged therewithin, wherein the optical fiber is frictionally engaged within the fiber bore of the fiberoptic connector.

It is yet a further advantage of the present invention that it provides a method for the manufacturing of a fiberoptic connector assembly that may be accomplished in a relatively short time period.

The foregoing and other objects, features and advantages of the present invention will become apparent from the following detailed description of the preferred embodiments which make reference to the several figures of the drawing.

IN THE DRAWING

DETAILED DESCRIPTION OF THE PREFERRED EMBODIMENT

Figure 2:
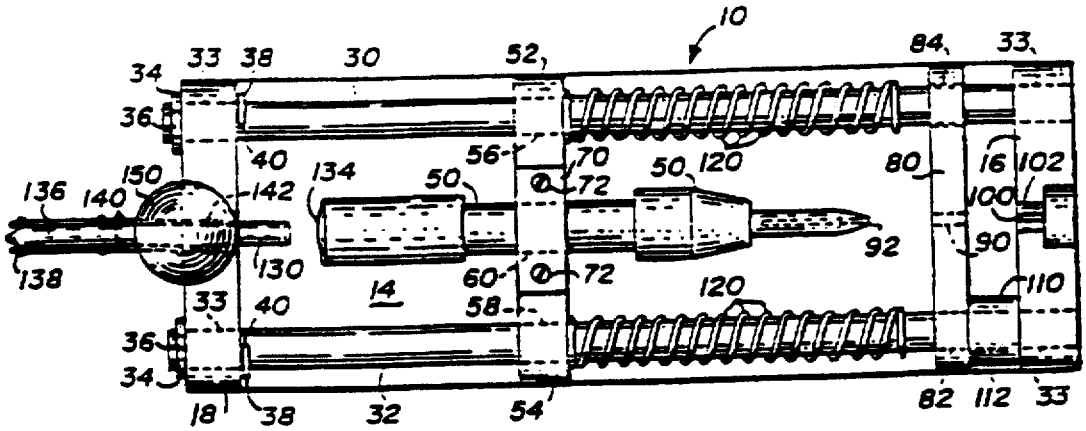
FIG. 2 is a top plan view of the device depicted in FIG. 1.
Figure 4:
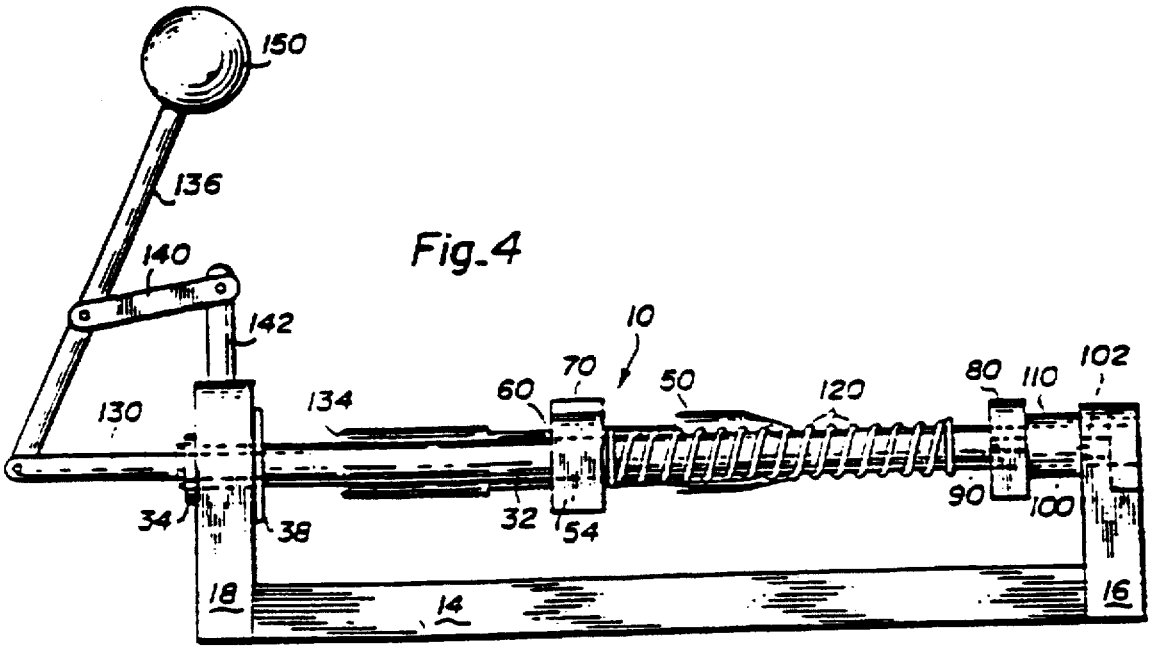
FIG. 4 is a side elevational view of the device depicted in FIG. 1.
Figure 3:
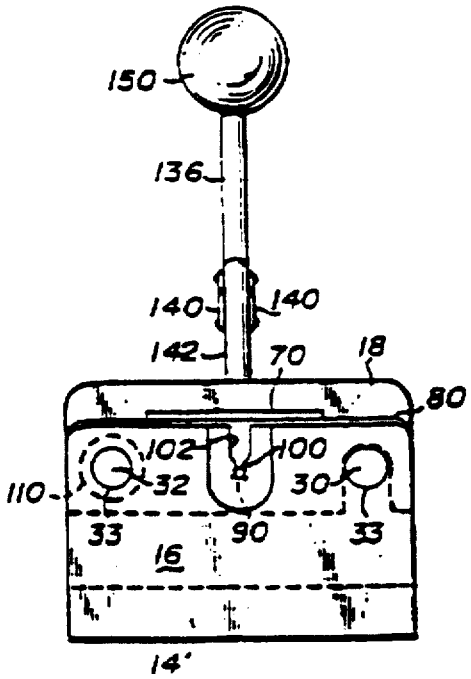
FIG. 3 is an end elevational view of the device depicted in FIG. 1.

As depicted in FIGS. 2, 3 and 4, the fiberoptic connector assembly device 10 includes a frame 12 having a generally rectangular base 14, a first generally rectangular side piece 16 which projects upwardly from a first shorter end of the base 14, and a second generally rectangular side piece 18 which projects upwardly from the other short end of the base 14 opposite the first end. Two rails 30 and 32 are disposed in a parallel relationship between the end members 16 and 18, such that the rails 30 and 32 are parallel to the surface of the base member 14 and displaced upwardly from the base 14. In the preferred embodiment, the rails 30 and 32 are cylindrical members that project through engagement holes 33 formed in the side members 16 and 18. In the preferred embodiment the rails 30 and 32 are slidably engaged within the holes 33 formed through the sides 16 and 18 utilizing a circlip 34 which resides in a groove 36 formed in the outer end of each rail 30 and 32, and a cotter pin 38, engaged in a pin bore 40 formed through each rail 30 and 32 proximate the inner side of side member 18, see FIGS. 2 and 4.

A spring loaded punch 50 is releasably engaged within a punch engagement slide 52. The punch engagement slide 52 includes a generally rectangular body 54 having two bores 56 and 58 formed therein in parallel axial alignment with the rails 30 and 32 respectively. It is therefore to be understood that the punch holding device 52 is slidably engaged upon the rails 30 and 32. The punch 50 is releasably held within a bore 60 that is formed through the body 54 in a parallel axial alignment with the bores 56 and 58. In the preferred embodiment the releasable engagement of the punch 50 within the body 54 is accomplished utilizing a removable punch engagement member 70 that is engaged with the body 54 utilizing two engagement screws 72. The lower surface of the member 70 is disposed to intersect the bore 60, such that the removal of the member 70 will permit the punch 50 to be removed from the bore 60.

A generally rectangular fiberoptic connector alignment holder 80 is pivotally engaged between the rails 30 and 32 in a generally parallel relationship to the punch holder 52 and the side member 16. A bore 82 is formed through the holder 80 in axial alignment with bore 58, such that rail 32 projects through the bore 82 and the holder 80 is slidably and pivotally engaged with the rail 32. A slot 84 is formed through the holder 80 proximate the intersection of holder 80 with rail 30, such that the inner end 86 of the slot 84 slidably engages the rail 30. It is therefore to be understood that the holder 80 is pivotally engaged between the rails 30 and 32 through the engagement [o] *of rail* 32 within the bore 82. A fiberoptic connector alignment bore 90 is formed through the holder 80 in axial alignment with the impact nose 92 of the punch 50. The bore 90 serves to hold i and align the tip of a fiberoptic connector for assembly with an optical fiber as is discussed in detail hereinbelow.

A narrow optical fiber holding slot 100 is formed downwardly through the top surface of the side member 16 in axial alignment with the bore 90. The slot 100 is formed with a width sufficient to hold an optical fiber and a rearwardly projecting metallic core of a connector if such is present in the connector device. However, the width of the slot 100 is less than the diameter of the rearward end of the connector, such that a connector will properly reside within the assembly device as is shown and described in detail hereinafter. In the preferred embodiment, the slot 100 is significantly widened at its upper end 102 to facilitate the insertion of a connector with an engaged optical fiber within the device.

In the preferred embodiment, a cylindrical spacer 110, having a bore 112 formed therethrough for the slidable engagement of the spacer 110 upon rail 32, is engaged between the side member 16 and the connector alignment holder 80. The thickness of the spacer 110 is related to the length of a connector which is to be assembled utilizing the device, as is hereinbelow discussed.

In the preferred embodiment, a punch retractor coil spring 120 is axially mounted upon each rail 30 and 32 between the punch mounting slide 52 and the connector alignment holder 80. The coil spring 120 serve to provide a retraction force to the punch 50 during assembly operations, as is discussed hereinbelow. To facilitate the operation of the punch 50, a push rod 130 is slidably mounted through a push rod bore 132 formed through the side member 18 in axial alignment with the punch 50 and side rails 30 and 32. The push rod 130 is axially aligned with the rearward end 134 of the punch 50 to apply an axial force to the punch 50. In the preferred embodiment, a lever arm 136 is pivotally engaged to the distal end 138 of the push rod 130 through arm members 140 that are engaged to a vertically extending rod 142 that is engaged to the side member 18. A handle knob 150 is engaged to the upper end of the lever arm 136 for hand activation of the push rod 130 as is discussed hereinafter. The operation of the device is next discussed with the aid of FIGS. 5, 6, 7 and 8.

Figure 1:
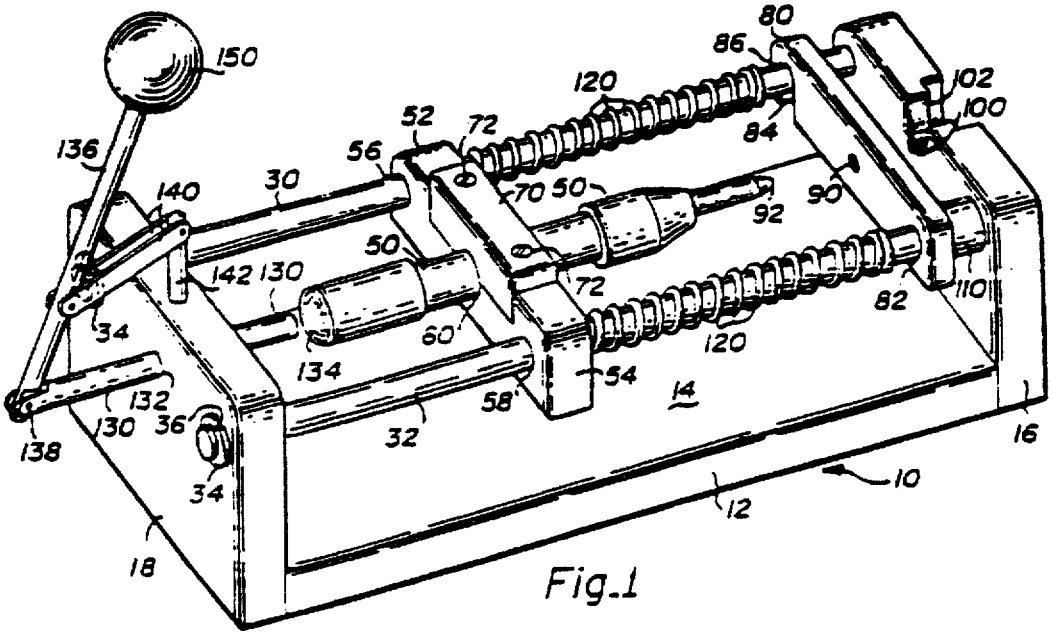
FIG. 1 is a perspective view of the fiberoptic connector assembly device of the present invention.
Figure 5:
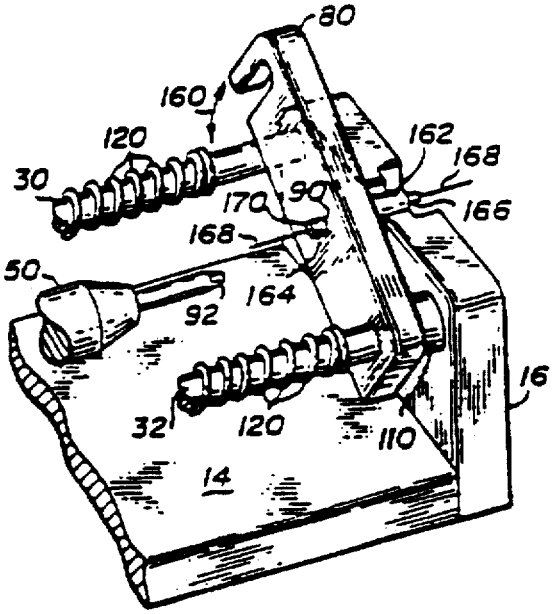
FIG. 5 is a perspective view of the present invention showing a connector with optical fiber disposed therewithin, in loading position.
Figure 6:
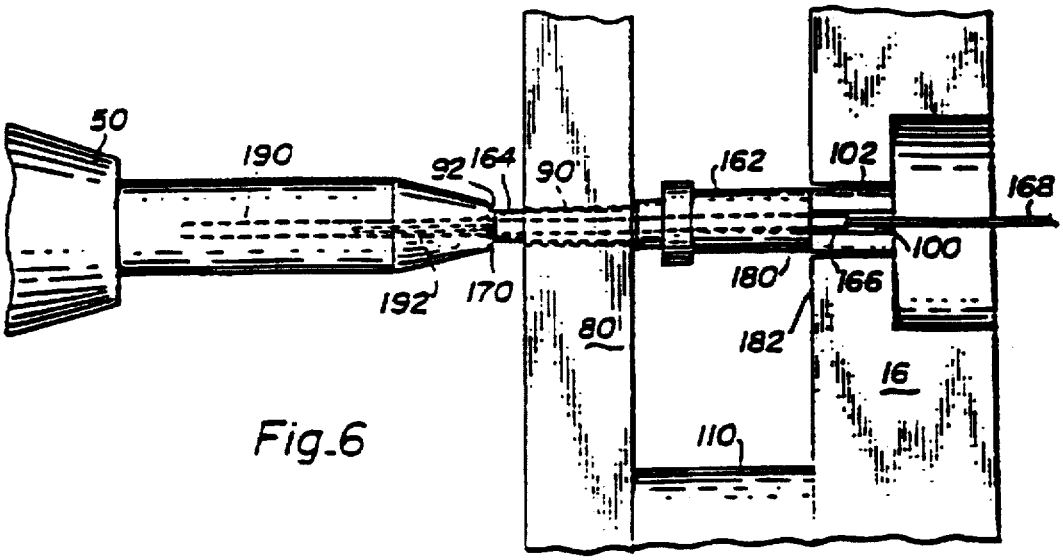
FIG. 6 is a top plan view of the present invention depicting a connector in position for assembly upon an optical fiber.
Figure 7:
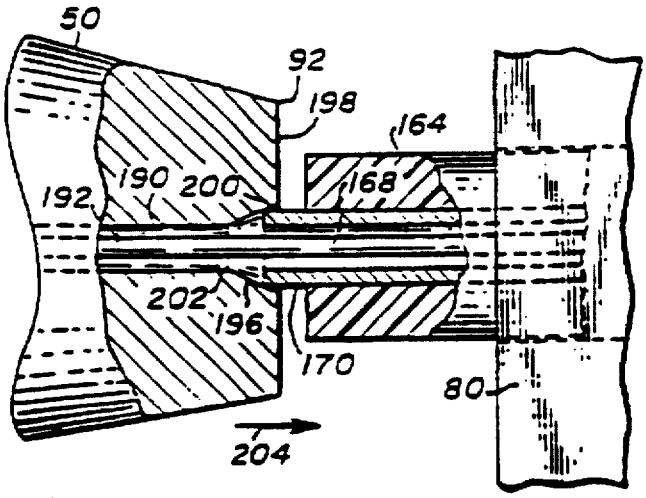
FIG. 7 is a close up view, with cutaway portions, of the tip of the connector, as depicted in FIG. 6.
Figure 8:
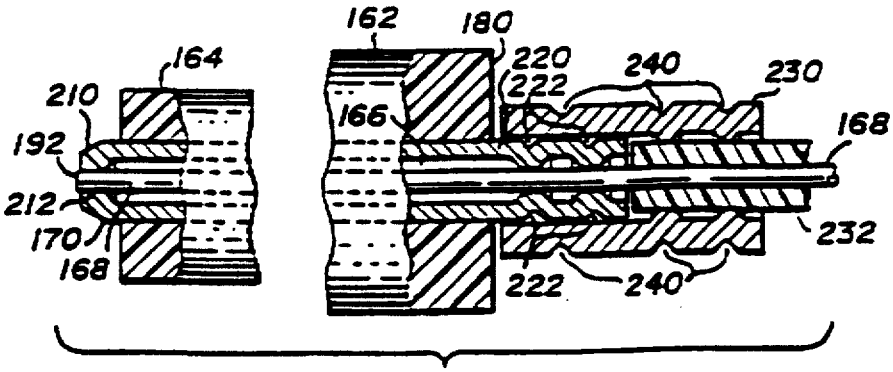
FIG. 8 is a side elevational view, with cutaway sections, of a fiberoptic connector assembly of the present invention.

The pivotally mounted connector holder 80 is shown in its upwardly pivoted orientation (see arrow 160) in FIG. 5. In this upwardly pivoted orientation, a fiberoptic connector 162 is inserted into the alignment bore 90 from the outboard side of the holder 80, such that the forward tip 164 of the connector 162 projects through the hole 90. The connector 162 includes a metallic, tubular core 166 and an optical fiber 168 is disposed in the central bore of the core 166. As is best seen in FIGS. 6, 7 and 8, a small portion 170 of the metallic core 166 project outwardly from the front tip 164 of the connector 162. After the connector 162 has been inserted in the alignment hole 190, the holder 80 is pivotally lowered to its connector assembly position, as depicted in FIG. 1.

FIG. 6 is a top plan view of the present invention showing a connector 162 in position for assembly. It is to be understood that the connector holder 80 has been pivotally lowered to its assembly position. The rearwardly projecting optical fiber 168 and the rearward portion of the metallic core 166 reside within the narrow slot 100 formed in the side member 16. The rearward end 180 of the housing of the connector 162 abuts against the inner surface 182 of the side 16, and forward portions of the housing of the connector 162 project through the alignment hole 90, such that the tip 164 of the connector 162 projects outwardly of the holder 80. The spacer 110 is disposed between the holder 80 and the inner surface 182 of the side 16 to maintain an appropriate spacing that facilitates the loading of connectors into the mounting hole 90 and slot 100 during the pivotal lowering of the holder 80.

After the holder 80 with its engaged connector 162 as been pivotally lowered into the assembly position, the punch 50 is slid forward along the rails 30 and 32 towards the holder 80. The sliding movement is accomplished by the axial manipulation of the push rod 130 by the lever arm 136 upon the users manipulation of the handle 150.

After the nose 92 of the punch 50 has made contact with the tip 164 of the connector 162, such that the rearward end 180 of the connector 162 is butted against the surface 182 of the side 16, continued axial pressure from the push rod 130 causes the compression of a spring (not shown) within the punch 50. The spring is adjustably calibrated such that a selectable amount of axial force must be applied to the punch before it releases. Spring loaded punches such as this are well known in the art; however, such prior art punches are not known to have cone shaped orifices as is next described.

As is depicted in FIG. 6, the nose 92 of the punch 50 has been brought forward to make contact with the projecting portion 170 of the metal core 166. FIG. 7 depicts an enlarged view of the assembly interface between the nose 92 of the punch 50 and the tip 164 of the connector 162. As is seen with the aid of FIGS. 6 and 7, an optical fiber bore 190 is axially disposed within the nose 92 of the punch 50. The depth of the bore 190 is sufficient to hold a projecting length 192 of the optical fiber 168 that projects forwardly from the tip 164 of the connector 162. The outer opening 196 of the bore 190 is tapered outwardly, to form a cone shaped opening to the bore 190 proximate the face 198 of the nose 92 of the punch 50. As is depicted in FIG. 7, the diameter of the cone shaped opening 196 at its outer end 200 is greater than the diameter of the extending tip 170 of the metallic core 166, whereas the inner end 202 of the cone shaped opening 196 has a diameter that is less than the diameter of the projecting metallic tip 170. It is therefore to be understood that when the punch 50 is activated laterally (see arrow 204) that the inwardly tapering surface of the opening 196 will cause the projecting metallic tip 170 to be uniformly deformed inwardly to surround and frictionally engage the surface of the optical fiber 168 disposed within the metallic core 170.

FIG. 8 depicts the fiberoptic connector assembly of the present invention following the assembly operations. As depicted therein, the outer surface 210 of the metallic core tip 170 has been deformed by the impact of the tapered opening 196 of the punch 50. The inner surface 212 of the metallic tip 170 has been compressed to make frictional engagement with the outer surface of the optical fiber 168 in the area proximate the outer deformation 210 of the metallic tip 170. In a separate process, the projecting portion 192 of the optical fiber 168 has been cleaved at its exit point to create an optical fiber 168 having a connector 164 engaged to the tip thereof.

To provide increased mechanical engagement of the optical fiber 168 with the connector 162, the rearward projecting end 220 of the metallic core 166 may be crimped 222 about the fiber. Alternatively or additionally, a metal sleeve 230 may be inserted over the projecting end 220 of the metallic core 166, and the sleeve 230 may hold both the optical fiber 168 and the buffer or jacket 232 of the optical fiber therewithin. The sleeve 230 is then crimped 240 to provide a firm rearward engagement of the optical fiber with the fiberoptic connector.

As is known to those skilled in the art, there exists a plurality of connector configurations, each having uniquely defined dimensions, such as length, tip diameter, etc. Thus, for various types of such connector the length of the spacer 110, the diameter of the connector alignment bore 90 and the thickness of the holder 80 may all be adapted to the dimensions of the various connectors. Additionally, the dimensions of the cone shaped opening 196 may also require modification to adapt the punch to the dimensions of the metallic core of a particular connector. All such variations and modifications are within the contemplation of the invention.

While the invention has been shown and described with reference to particular preferred embodiments, it will be understood by those skilled in the art that various alterations and modifications in form and detail may be made therein. Accordingly, it is intended that the following claims cover all such alterations and modifications as may fail within the true spirit and scope of the invention.

What is claimed is:

1. A method for assembling a fiberoptic connector and an optical fiber, comprising:

constructing a fiberoptic connector such that it includes an optical fiber bore and a mechanically deformable portion disposed proximate said optical fiber bore;

inserting an optical fiber into said bore, such that portions of said optical fiber are disposed adjacent said deformable portion of said fiberoptic connector;

mechanically deforming said deformable portion such that said optical fiber *thereby* becomes frictionally engaged within said fiberoptic connector[.]; *and*

*wherein the deformable portion comprises a metal, and wherein the deformable portion is substantially uniformly swaged around a portion of the optical fiber, thereby frictionally adhering the deformable portion and the portion of optical fiber together.*

2. A method for assembling a fiberoptic connector and an optical fiber as described in claim 1 further including the steps of symmetrically deforming said deformable portion, such that said optical fiber is held in a centrally disposed orientation relative to said bore of said fiberoptic connector.

3. A method for assembling a fiberoptic connector and an optical fiber as described in claim 2, further including the steps of crimping a rearwardly projecting portion of said fiberoptic connector about said optical fiber to mechanically engage said optical fiber therewithin.

4. A method for assembling a fiberoptic connector and an optical fiber as described in claim 2 further including the steps of inserting a sleeve member around rearward portions of said fiberoptic connector, such that said sleeve portion also surrounds portions of said optical fiber; and crimping said sleeve member about said rearwardly disposed portions of said fiberoptic connector and about said portions of said optical fiber to mechanically join said optical fiber to said rearward portions of said fiberoptic connector.

5. A fiberoptic connector assembly device for connecting a fiberoptic connector to an optical fiber comprising:

a support means, said support means including a fiberoptic connector holding means being engaged thereto;

a connector engagement means, said connector engagement means being engaged to said support means and functioning to effect the connection of said fiberoptic connector to said optical fiber; movement means, said movement means being engaged to said support means and operable to cause said connector engagement means to make physical contact with said fiberoptic connector, whereby said connector engagement means will cause portions of said fiberoptic connector to become deformed upon said physical contact such that said optical fiber will become functionally engaged within said fiberoptic connector; and wherein said fiberoptic connector holding means is pivotally engaged to portions of said support means.

6. A fiberoptic connector assembly device for effecting the frictional engagement of an optical fiber within a fiberoptic connector, wherein said fiberoptic connector includes a deformable portion that may be mechanically deformed to frictionally engage said optical fiber therewithin, comprising:

support means[;], *wherein said support means includes a base member and first and second opposing side members, said first and second side members being fixedly engaged to said base member;*

*said support means including two rail members being engaged between said side members in a generally parallel relationship;*

*connector engagement means support member, said connector engagement means support member being slidably engaged to said rail members and operating to hold said connector engagement means between said rail members;* fiberoptic connector holding means for holding said fiberoptic connector and an optical fiber disposed therewithin during assembly[;], *said fiberoptic connector holding means being pivotally engaged to one of said rail members and having a connector holding bore formed therethrough in generally parallel relationship to said rail members, whereby said fiberoptic connector is held for assembly between said rail members;*

*said fiberoptic connector holding means being disposed in a spaced apart relationship relative to said first side member; an optical fiber slot being formed through portions of said first side member, said optical fiber slot being formed in axial alignment with said connector holding bore, such that an engagement end of said fiberoptic connector will project through said connector holding bore of said fiberoptic connector holding means, and a rearward end of said fiberoptic connector will butt against portions of said first side member proximate said optical fiber slot, and said optical fiber disposed within said fiberoptic connector will project through said slot;* connector engagement means, said connector engagement means being engaged to portions of said support means;

movement means, said movement means being engaged to portions of said support means and operable to cause said connector engagement means to make physical connect with said deformable portion of said fiberoptic connector, whereby said deformable portion of said fiberoptic connector will become mechanically deformed proximate said optical fiber upon the occurrence of said physical contact, such that said optical fiber will become frictionally engaged within said fiberoptic connector[.]; *and*

*said movement means being engaged to said second side member, said movement means including a pushing means operable to push said connector engagement means towards said fiberoptic connector holding means.*

[7. A fiberoptic connector assembly device as described in claim 6 wherein said support means includes a base member and first and second opposing side members, said first and second side members being fixedly engaged to said base member;

said support means including two rail members, said rail members being engaged between said side members in a generally parallel relationship;

connector engagement means support member, said connector engagement means support member being slidably engaged to said rail members and operating to hold said connector engagement means between said rail members;

said fiberoptic connector holding means being pivotally engaged to one of said rail members and having a connector holding bore formed therethrough in generally parallel relationship to said rail members, whereby said fiberoptic connector is held for assembly between said rail members;

said fiberoptic connector holding means being disposed in a spaced apart relationship relative to said first side member an optical fiber slot being formed through portions of said first side member, said optical fiber slot being formed in alignment with said connector holding bore, such that an engagement end of said fiberoptic connector will project through said connector holding bore of said fiberoptic connector holding means, and a rearward end of said fiberoptic connector will butt against portions of said first side member proximate said optical fiber slot, and said optical fiber disposed within said fiberoptic connector will project through said slot;

said movement means being engaged to said second side member, said movement means including a pushing means operable to push said connector engagement means towards said fiberoptic connector holding means.]

8. A fiberoptic connector assembly device as described in claim [7] *6* wherein said connector engagement means includes a spring loaded punch means, said punch means having an impact nose disposed for making contact with said fiberoptic connector to mechanically deform said deformable portion of said fiberoptic connector.

9. A fiberoptic connector assembly device as described in claim 8 wherein said nose portion of said punch means includes a connector deformation bore formed therein.

10. A fiberoptic connector assembly device as described in claim 9 wherein said connector deformation bore includes a conical portion, said conical portion being disposed to make contact with said deformable portion of said fiberoptic connector, whereby said deformable portion of said fiberoptic connector will be uniformly deformed about said optical fiber, such that said optical fiber will become frictionally engaged in a centrally disposed orientation relative to said fiberoptic connector.

11. A fiberoptic connector assembly, comprising:

a fiberoptic connector, said fiberoptic connector including an axial optical fiber bore being formed therethrough;

said fiberoptic connector having at least one mechanically deformable portion disposed proximate said optical fiber bore;

an optical fiber being disposed within said optical fiber bore;

said mechanically deformable portion being deformed adjacent said optical fiber, such that segments of said deformable portion are frictionally engaged to said optical fiber to hold said optical fiber within said fiberoptic connector[.];

*wherein the deformable portion comprises a metal, and wherein the deformable portion is substantially uniformly swaged around a portion of the optical fiber, thereby frictionally adhering the deformable portion and the portion of optical fiber together.*

12. A fiberoptic connector assembly as described in claim 11 wherein said deformable portion includes a metallic member forming portions of said optical fiber bore.

13. A fiberoptic connector assembly as described in claim 11 wherein said fiberoptic connector includes a generally tubular metallic core member being disposed within said fiberoptic connector and forming said optical fiber bore;

said fiberoptic connector also including a housing portion being disposed to surround and engage said core member;

a tip portion of said core member projecting forwardly from said housing member;

an optical fiber being disposed within said optical fiber bore and projecting to said tip portion;

said tip portion being deformed about said optical fiber to frictionally engage said optical fiber.

14. A fiberoptic connector assembly device as described in claim 13 wherein said tip [potion] *portion* is deformed in a radially symmetrical manner, such that said optical fiber is engaged in a centrally disposed location relative to said optical fiber bore.

15. A fiberoptic connector assembly device as described in claim 13 wherein a portion of said core member is disposed to project rearwardly from said housing member, and said rearwardly projection portion of said core member is crimped to mechanically engage said optical fiber disposed therewithin.

16. A fiberoptic connector assembly device as described in claim 15, further including a sleeve member being engaged to said rearwardly projecting portion of said core member, said sleeve member enclosing portions of said optical fiber and a jacket covering of said optical fiber therewithin;

said sleeve member being crimped to frictionally engage said rearwardly projecting portion of said core member and said jacket portion of said optical fiber.

*17. The method of claim 1, further comprising crimping a rearward portion of the fiberoptic connector about the optical fiber to mechanically engage the optical fiber therewithin.*

*18. The method of claim 1, further comprising inserting a sleeve member around a rearward portion of the fiberoptic connector such that the sleeve member substantially surrounds at least a portion of the optical fiber, and crimping the sleeve member about the rearward portion of the fiberoptic connector and about the portion of the optical fiber to mechanically join a portion of the optical fiber to a portion of the rearward portion of the fiberoptic connector.*

*19. The method of claim 1 wherein a tapered surface is applied to mechanically deform the deformable portion.*

*20. The method of claim 1 wherein a substantially conically-shaped surface is applied to mechanically deform the deformable portion.*

*21. The method of claim 1 wherein the deformable portion is mechanically deformed such that it substantially surrounds at least a portion of the optical fiber.*

*22. A fiberoptic connector made by the method of claim 21.*

*23. A fiberoptic connector made by the method of claim 1.*

*24. A device adapted for making a fiberoptic connector with a deformable portion deformed against at least a portion of an optical fiber, comprising:*

*a fiberoptic connector holder adapted to hold a fiberoptic connector and an optical fiber during use;*

*an engaging surface including a tip having a tapered opening; and*

*a movement system adapted to move the tip of the engaging surface and the deformable portion of a fiberoptic connector in relationship to one another, the movement being with enough force to deform the deformable portion against at least a portion of an optical fiber during use such that the optical fiber is frictionally adhered to the fiberoptic connector, wherein the deformable portion comprises a metal, and wherein the deformable portion is substantially uniformly swaged around the portion of the optical fiber.*

*25. The device of claim 24 wherein the movement system includes a handle coupled to a lever, the lever being in turn coupled to the engaging surface and the handle and lever being adapted to move the engaging surface when the handle is manually operated during use.*

*26. The device of claim 24, further comprising a frame the engaging surface and the fiberoptic connector holder being coupled to the frame during use.*

*27. The device of claim 25 wherein the opening on the tip of the engaging surface is substantially conically shaped.*

*28. The device of claim 24 wherein the fiberoptic connector holder is adapted to hold a portion of an optical fiber in a substantially central location within a bore of the fiberoptic connector during use.*

*29. The device of claim 24 wherein the fiberoptic connector holder is adapted to hold the fiberoptic connector, and an optical fiber within the fiberoptic connector, in a substantially stationary position while the engaging surface is pressed against the fiberoptic connector during use.*

*30. The device of claim 29 wherein the fiberoptic connector holder includes a stop that is adapted to engage the fiberoptic connector during use such that the fiberoptic connector does not move when pressed by the engaging surface during use.*

*31. The device of claim 24 wherein the engaging surface is slidably engaged on a rail such that the engaging surface is in alignment with a tip of a fiberoptic connector during use.*

*32. The device of claim 24, further comprising a fiberoptic connector being held by the fiberoptic connector holder, the fiberoptic connector including an optical fiber disposed within it.*

*33. The device of claim 24 wherein the device is adapted to join a fiberoptic connector and an optical fiber together without use of a liquid adhesive.*

* * * * *